United States Patent [19]
Yamamoto et al.

[11] Patent Number: 5,929,343
[45] Date of Patent: Jul. 27, 1999

[54] DEVICE FOR MEASURING POWDER FLOW RATE AND APPARATUS AND METHOD FOR SUPPLYING POWDER

[75] Inventors: Masahiro Yamamoto, Chiba; Hiroki Murai, Tokyo; Yutaka Ishikawa; Mitsuyoshi Kumata, both of Chiba; Keiji Kanai, Saitama, all of Japan

[73] Assignee: Nihon Parkerizing Co., Ltd., Tokyo, Japan

[21] Appl. No.: 08/737,270

[22] PCT Filed: Mar. 26, 1996

[86] PCT No.: PCT/JP96/00785

§ 371 Date: Nov. 6, 1996

§ 102(e) Date: Nov. 6, 1996

[87] PCT Pub. No.: WO96/30725

PCT Pub. Date: Oct. 3, 1996

[30] Foreign Application Priority Data

| Mar. 30, 1995 | [JP] | Japan | 7-074019 |
| Apr. 4, 1995 | [JP] | Japan | 7-079005 |
| Apr. 20, 1995 | [JP] | Japan | 7-095397 |
| Jun. 12, 1995 | [JP] | Japan | 7-169172 |

[51] Int. Cl.$^6$ .................................................. G01F 1/56
[52] U.S. Cl. ............................................... 73/861.08
[58] Field of Search ................................ 73/861, 861.08, 73/861.12, 861.02, 861.04, 861.06; 324/627; 361/816

[56] References Cited

U.S. PATENT DOCUMENTS

| 4,270,558 | 6/1981 | Forster et al. | 73/861.02 |
| 4,509,366 | 4/1985 | Matsushita et al. | 73/861.04 X |
| 4,619,145 | 10/1986 | Girgenti | 73/861.08 X |
| 5,351,558 | 10/1994 | Horn et al. | 73/861 X |
| 5,421,210 | 6/1995 | Kobayashi et al. | 73/861.08 X |
| 5,454,271 | 10/1995 | Yamamoto et al. | 73/861.04 |
| 5,560,246 | 10/1996 | Bottinger et al. | 73/861.08 X |

FOREIGN PATENT DOCUMENTS

| 56-154072 | 4/1983 | Japan | 73/861.02 |

*Primary Examiner*—Elizabeth L. Dougherty
*Attorney, Agent, or Firm*—Wenderoth, Lind & Ponack, L.L.P.

[57] ABSTRACT

A pair of measuring electrodes (63, 64; 73, 74) are provided along the circumferential portion of a cylindrical measuring tube (62; 72) made of an insulating material. The flow rate of powder passing through the measuring tube is measured as a change in the electrostatic capacity between the pair of measuring electrodes.

4 Claims, 8 Drawing Sheets

DEVICE FOR MEASURING POWDER FLOW RATE AND APPARATUS AND METHOD FOR SUPPLYING POWDER

BACKGROUND OF THE INVENTION

1. Field of the Invention

This invention relates to a device for measuring the powder flow rate of a powder coating material or the like, and more particularly to a device for measuring a power flow rate as a change in capacity.

Moreover, this invention further relates to an apparatus and a method for supplying powder, which is applied, for example, in performing a powder coating by supplying a powder coating material to a spray gun.

2. Description the Related Art

In the field of automated powder coating, there is the necessity of always supplying a powder coating material at a constant rate so as to realize a uniform finish coating film and to efficiently utilize a coating material. Thus, there have been various methods for measuring a power flow rate. The applicant for the present application have proposed a method for measuring a powder flow rate while utilizing the measurement of the density of powder, and further have proposed an apparatus for performing such a method, in Japanese Patent Laid-Open No. 7-35591/1995. In accordance with this method, the density of powder is measured from various physical quantities such as light transmissivity, ultrasonic transmittance and electrostatic capacity. Then, the powder flow rate is measured from the measured value of the powder density. Thus, as compared with a conventional method for measuring a flow rate by detecting a pressure difference or the like, a powder flow rate can be measured according to this proposed method by using a very simple mechanism. Consequently, there can be realized a device for measuring a powder flow rate, whose manufacturing cost is low and maintenance is easily achieved, and color is easily changed.

Among the methods disclosed in the aforementioned Japanese Patent Laid-Open No. 7-35591/1995, the method of measuring the powder flow rate from change in the electrostatic capacity between a pair of measuring electrodes is extremely simple and convenient and thus can be used preferably. However, in the case of employing this method, the electrostatic capacity is susceptible to a change in the ambient temperature and may vary with the structure of the used electrodes and with the manner in which the electrodes are mounted. Moreover, the measured value of the electrostatic capacity may vary with the place through which the powder passes.

Furthermore, the powder sometimes adheres to the wall of a supply passage. This may cause variation in the quantity of supplied powder.

SUMMARY OF THE INVENTION

It is an object of this invention to provide a powder flow rate measuring device which can accurately measure a powder flow rate without being affected by a change in the ambient temperature and a place through which the powder passes.

Moreover, it is another object of this invention to provide a powder supplying apparatus that can supply powder at a constant rate, and to provide a method for supplying powder at a constant rate.

DESCRIPTION OF THE PREFERRED EMBODIMENTS

Hereinafter, the preferred embodiments of the present invention will be described by referring to the accompanying drawings.

Embodiment 1.

Figure 1:
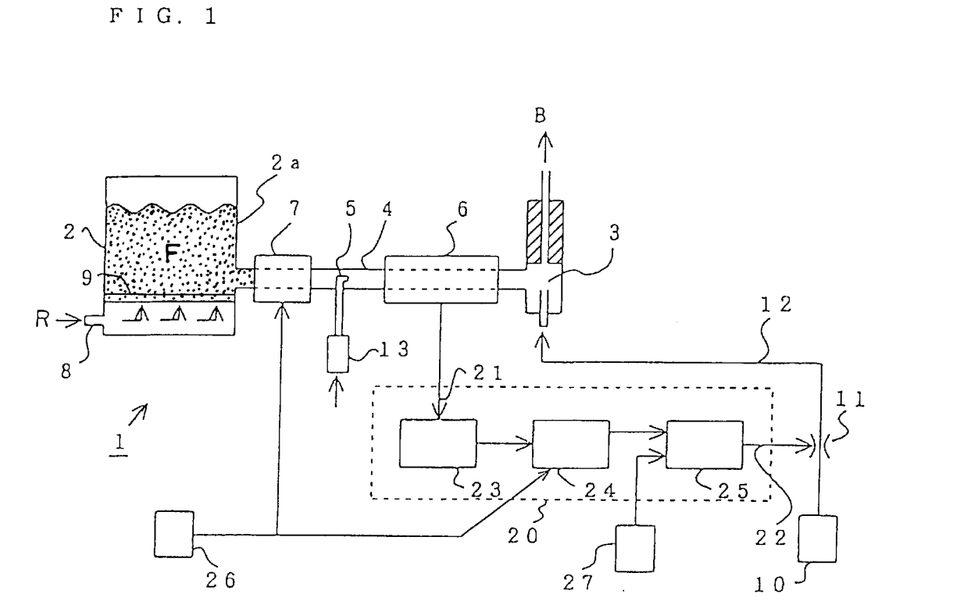
FIG. 1 is a block diagram illustrating a powder supplying apparatus according to Embodiment 1 of the present invention.

As shown in FIG. 1, a powder supplying apparatus 1 of Embodiment 1 consists mainly of: a tank 2 for containing powder therein; a conveying tube 4 for connecting the tank 2 with an injector 3; a blowing nozzle 5 for blowing compressed air, which is a fluid to be used when detecting powder, into the conveying tube 4; and a powder flow rate measuring device 6. The injector 3 is used for sending out powder at a necessary pressure to a portion B consisting of units, such as a spraying gun (not shown), for the next process. Incidentally, reference numeral 7 designates a pinch valve that is provided along the conveying tube 4 on the upstream side of the blowing nozzle 5 and is operative to open and close the powder passage provided in the conveying tube 4.

The tank 2 is called a fluidized-bed tank provided with a fluid supplying tube 8 and a perforated plate 9. Fluidizing air R is blown from a pressure source (not shown) into the tank 2 in which the powder F is thus maintained in a fluidized state. The powder F is sucked into the conveying tube 4 from the tank 2 and is further conveyed therethrough by connecting the conveying tube 4, which constitutes the powder passage, with the tank 2 and then blowing driving air into the injector 3 from the pressure air supply 10 while the pinch valve 7 is opened. Incidentally, reference numeral 11 denotes a motor valve for adjusting the quantity of driving air blown into the injector 3. Reference numeral 12 designates piping which extends from the pressure air supply 10 to the injector 3.

The blowing nozzle 5 is connected with an air supply (not shown) through a flow rate setting means 13 for setting the quantity of compressed air to be blown into the tube 4. Thus a predetermined quantity of air can be blown from the nozzle 5 into the tube 4 at all times. As disclosed in the aforesaid Japanese Patent Laid-Open No. 7-35591/1995 the powder flow rate to be measured in the conveying tube 4 is determined from a product of the flow rate of the detecting fluid blown from the blowing nozzle 5 thereinto and the density of powder in the tube 4. The measurement of the power flow rate by the powder flow rate measuring apparatus 6 is reliable made by measuring the density of the powder as a change in the electrostatic capacity.

Figure 2:
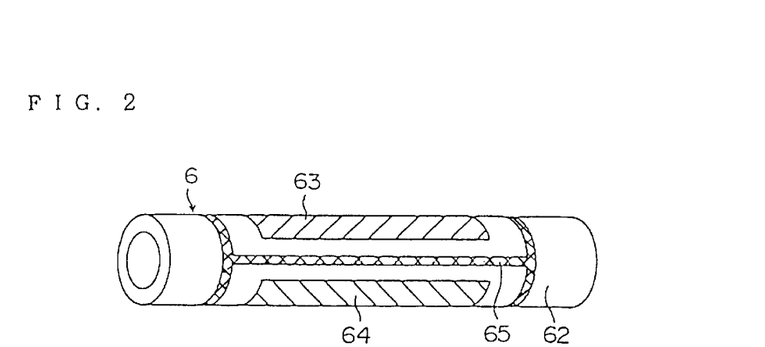
FIG. 2 is a perspective diagram showing a powder flow rate measuring device used in Embodiment 1.
Figure 3:
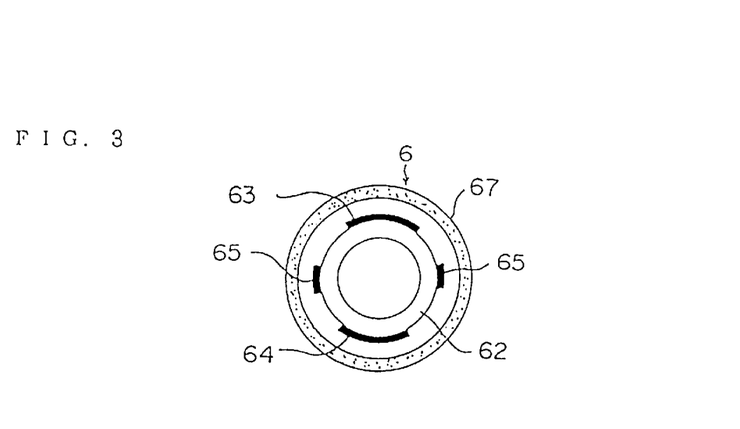
FIG. 3 is a sectional diagram showing the flow rate measuring device of FIG.2.

The configuration of the powder flow rate measuring apparatus 6 is illustrated in FIGS. 2 and 3. The flow rate measuring apparatus 6 has a source electrode 63 and a sense electrode 64, which are a pair of measuring electrodes provided along a measuring tube 62 on circumferential portions thereof, and a guard electrode 65. The measuring tube 62 is constituted by a cylindrical insulating tube, for example, a quartz glass tube. Each of the electrodes 63, 64 and 65 is printed on the outer surface of the measuring tube 62. Incidentally, copper foil may be stuck thereon instead of printing the electrode thereon. Further, the quartz glass tube, whose linear expansion coefficient is 5 to $6 \times 10^{-7}$/K or so, is used. Moreover, insulating materials such as alumina, ordinary glass, or if necessary, plastics may be used as the material of an insulating tube composing the measuring tube 62, instead of quartz glass.

The outer diameter, the inner diameter and the length of the measuring tube 62 are 7.0 mm, 5.0 mm and 110 mm, respectively. It is preferable for preventing the powder from adhering to the inner surface of the measuring tube 62 to apply a Teflon coating, which is 0.1 to 0.2 mm in thickness, thereto. The measuring tube 62 is accommodated in an external cylinder 67 which acts as a shield. The external cylinder 67 is a copper pipe, whose outer diameter, inner diameter and length are 12 mm, 10 mm and 80 mm, respectively, and is supported by the measuring tube 62 through a sealant (not shown). The external cylinder 67 may be made of aluminum or electrically conductive glass or the like.

Figure 4:
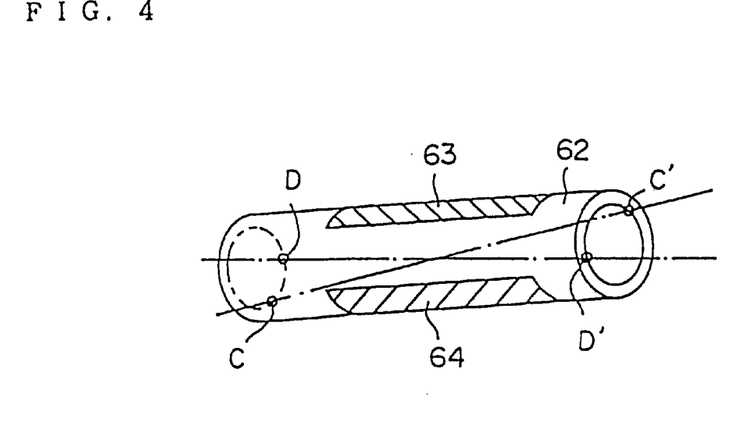
FIG. 4 is a perspective diagram illustrating a case when a nylon filament is inserted into the flow rate measuring device of FIG. 2.
Figure 5:
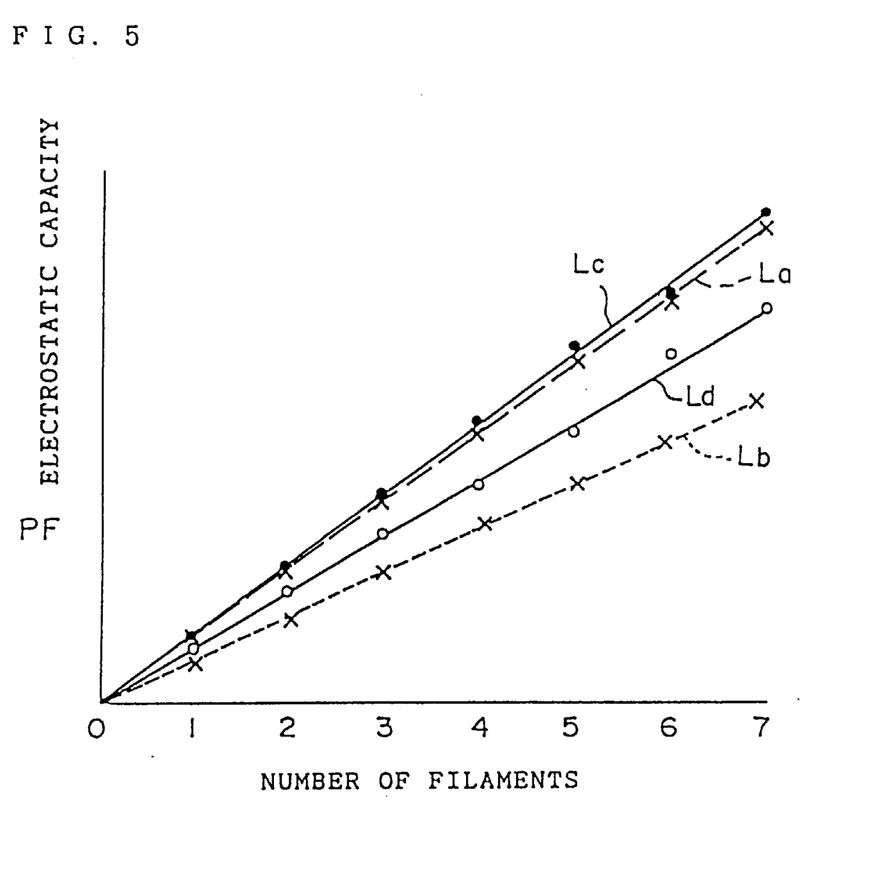
FIG. 5 is a graph illustrating the relation between the number of nylon filaments and the measured value of electrostatic capacity in the case when the filaments are inserted into the flow rate measuring device of FIG. 2 and a conventional flow rate measuring device.

When the electrostatic capacity is measured by using this powder flow rate measuring apparatus 6 and inserting a nylon filament into the measuring tube 62 in such a manner as to extend from the bottom point C of the inlet thereof toward the top point C' of the outlet thereof as shown in FIG. 4, a result of the measurement is represented by a straight line Lc of FIG. 5. Further, when the electrostatic capacity is measured by inserting a nylon filament into the measuring tube 62 in such a way as to extend from the left end point D of the inlet thereof toward the right end point D' of the outlet thereof, a result of the measurement is represented by a straight line Ld of FIG. 5. Incidentally, dashed lines La and Lb of FIG. 5 represent variations in measured values of the electrostatic capacity, which respectively correspond to a case when the electrostatic capacity is measured by using a conventional powder flow rate measuring apparatus, which uses a pair of parallel-plate electrodes, and inserting a nylon filament into the measuring tube 62 in such a manner as to extend from the bottom point C of the inlet thereof toward the top point C' of the outlet thereof and another case that the electrostatic capacity is measured by using the conventional powder flow rate measuring apparatus and inserting a nylon filament thereinto in such a way as to extend from the left end point D of the inlet thereof toward the right end point D' of the outlet thereof. As is understood from FIG. 5, in the case of the conventional powder flow rate measuring apparatus, the measured value (represented by dashed line La) of the electrostatic capacity in the case when the powder passes through the measuring tube while moving vertically therein is largely different from the measured value (represented by dashed line Lb) of the electrostatic capacity in the case when the powder passes through the measuring tube while moving horizontally therein. In contrast with this, when using the powder flow rate measuring apparatus of FIG. 2, the variation of the electrostatic capacity depending on the place, through which the powder passes, in the measuring tube 62 is small. Thus, the flow rate can be measured accurately.

Moreover, because of the fact that the measuring source electrode 63 and the measuring sense electrode 64 are formed along the circumferential portion of the measuring tube 62, these elements, namely, the measuring tube 62, the source electrode 63 and the sense electrode 64 undergo uniform thermal change in the shapes thereof. Thus, an error of the measured value of the electrostatic capacity occurs in proportion to change in heat. Consequently, such an error can be easily compensated for.

In the apparatus of FIG. 1, a control means 20 connected to the powder flow rate measuring device 6 is operative to output a control signal 22 in response to a signal 21 sent from the powder flow rate measuring device 6 and includes an amplifier 23, a correction circuit 24, a control circuit 25 and so forth. An alternating voltage is applied from an unillustrated power source to the source electrode 63 and the sense electrode 64 of the powder flow rate measuring device 6. Signals 21 sent from the source electrode 63 and the sense electrode 64 are inputted through a switching circuit and a synchronous detection circuit (not shown) to an amplifier 23 whereupon the signals are amplified. The amplified signal is inputted to the control circuit 25 after undergoing a correction corresponding to an on/off signal 26 sent from the spray gun or the like, for example, a zero-point correction in the correction circuit 24.

The zero-point correction is performed so as to reduce the influence of powder adhered to the inner wall of the measuring tube 62 during supplying the powder thereto to a degree that such powder has substantially no bad effects. Further, the zero-point correction is to correct a measured value of the capacity, which is obtained during operating the supplying apparatus, by using a measured value thereof, which is obtained after stopping the supplying apparatus, (namely, the measured value corresponding to the quantity of the adhered powder) as a correction reference value. Incidentally, an amplifier may be provided at the output side of the correction circuit 24.

In the control circuit 25, the measured value, which has been corrected by the correction circuit 24, is compared with a preset target value 27. Then, a signal representing the difference between these values is outputted to the motor valve 11 as the control signal 22. The motor valve 11 is controlled according to the control signal 22 and is operative to regulate the quantity of driving air sent from the pressure air supply 10 to the injector 3. Thereby, powder can be supplied from the injector 3 to the unillustrated spray gun at a constant rate.

Incidentally, the apparatus may be adapted in such a way that the opening of the pinch valve 7 can be adjusted by using the control signal 22, similarly as in the case of the motor valve 11 which is controlled by using the control signal 22.

Figure 6:
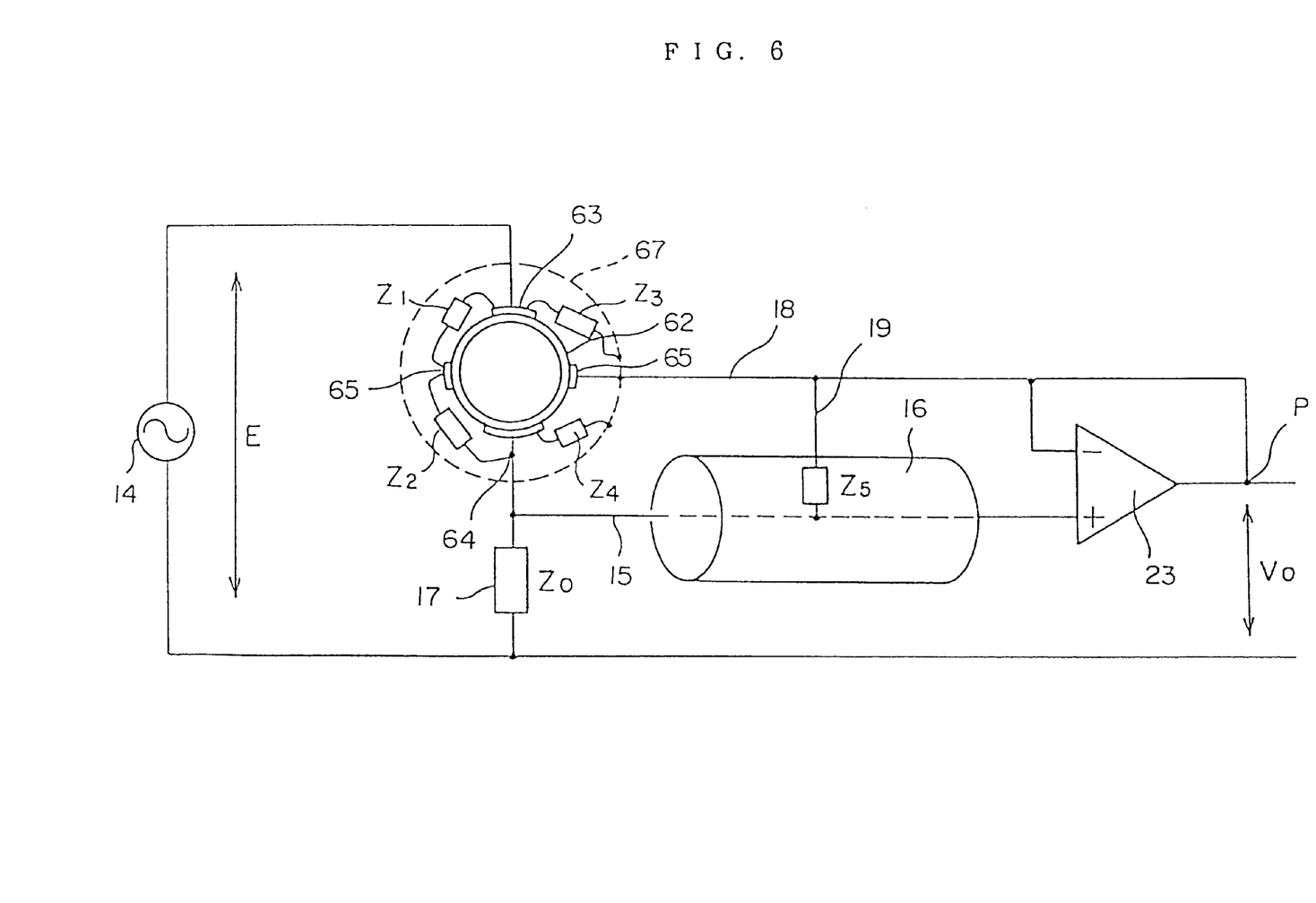
FIG. 6 is a schematic diagram illustrating an example of a modification of the powder flow rate measuring device.

Moreover, it is preferable that as illustrated in FIG. 6, a cable 15 for transmitting the signal 21 from the powder flow rate measuring device 6 to the control means 20 is shielded with a shielding tube 16 and that an output voltage of the amplifier 23 or the power supply voltage is applied to the shielding tube 16 and the external cylinder 67. Thereby, irregular impedance can be restrained from occurring across the source electrode 63 and the sense electrode 64 or between the cable 15 and the shielding tube 16. Consequently, the flow rate can be measured with further higher accuracy.

As shown in FIG. 6, a power supply 14 is connected to the source electrode 63 and the sense electrode 64 through an ammeter 17. In addition, the external cylinder 67 and the shielding tube 16 are connected to an output point P of the amplifier 23 through connecting lines 18 and 19. Thus, an output voltage $V_0$ of the amplifier 23 is applied thereto.

Figure 7:
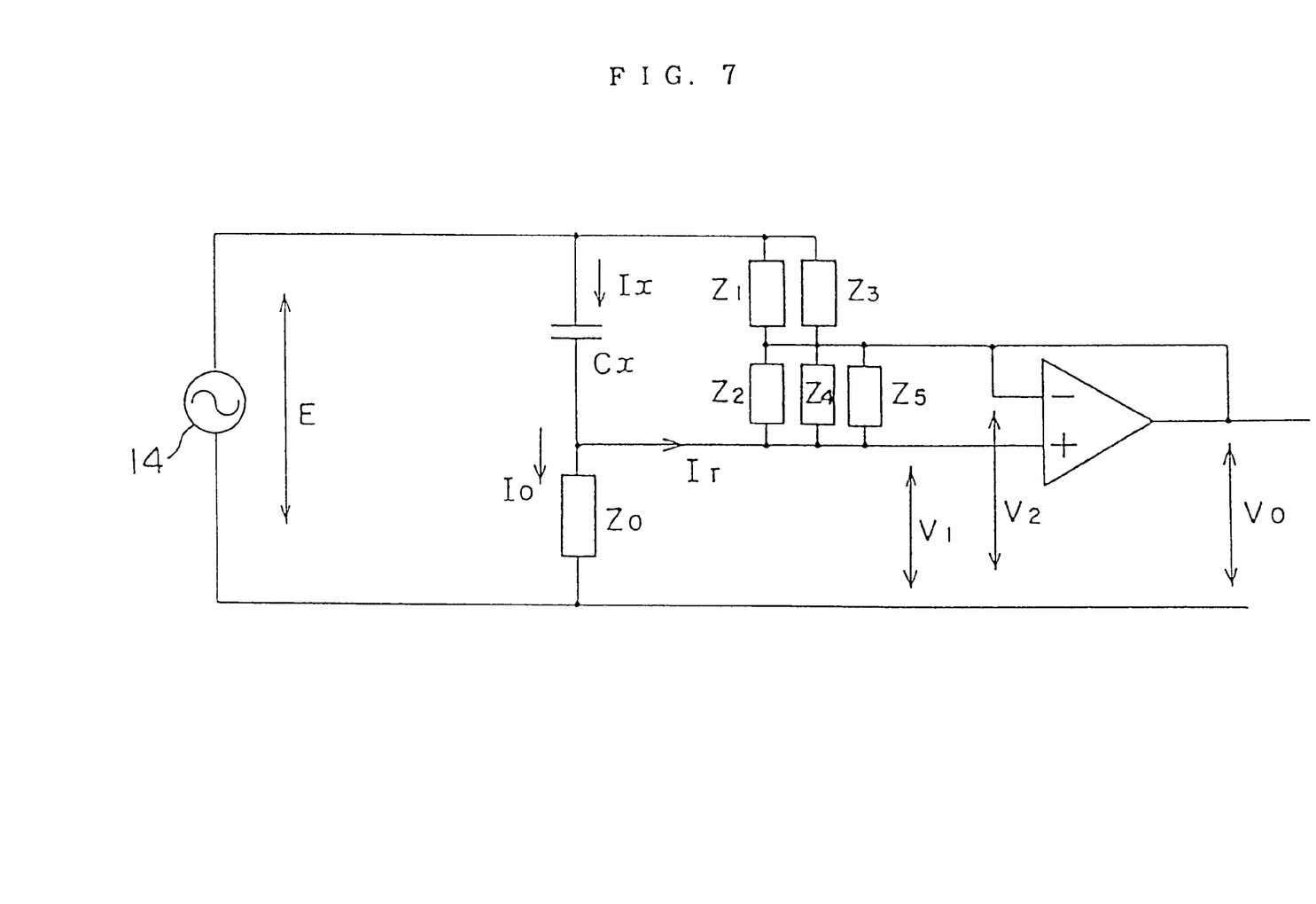
FIG. 7 is a diagram illustrating an equivalent circuit of the apparatus of FIG. 6.

FIG. 7 illustrates an equivalent circuit of the power flow rate measuring device of FIG. 6. Reference character E designates the power supply voltage; $Z_1$ the impedance across the source electrode 63 and the guard electrode 65; $Z_2$ the impedance across the guard electrode 65 and the sense electrode 64; $Z_3$ the impedance across the source electrode 63 and the external cylinder 67; $Z_4$ the impedance across the sense electrode 64 and the external cylinder 67; $Z_5$ the impedance across the cable 15 and the shielding tube 16; $Z_0$ the measuring impedance of the ammeter 17; Cx the capacity between the source electrode 63 and the sense electrode 64 to be measured; Ix an electric current flowing through the capacity to be measured; Ir an electric current flowing through the cable 15; $V_1$ a positive input voltage to the amplifier 23; $V_2$ a negative input voltage to the amplifier 23; A the amplification factor of the amplifier 23 ($V_0=(V_1-V_2)$ A); and $Z_{2\ 4\ 5}$ the combined impedance of the parallel-connected impedances $Z_2$, $Z_4$ and $Z_5$.

The output $V_0$ of the amplifier 23 is given by:

$$V_0=(V_1-V_2)A$$

Further, since $V_0=V_2$, $$V_0=(V_1-V_0)A \quad (1)$$

$$V_1=(Ix-Ir)Z_0 \quad (2)$$

$$Ir=(V_1-V_2)/Z_{2\ 4\ 5} \quad (3)$$

The following equation (4) can be obtained from these equations (1) to (3):

$$V_0=IxZ_0/[\{(1+A)/A\}+\{Z_0/AZ_{2\ 4\ 5}\}] \quad (4)$$

Usually, the amplification factor A of the amplifier 23 is 10000 to 100000. Thus, when the term ((1+A)/A) of the equation (4) is regarded as being 1 approximately, the output voltage of the powder flow rate measuring device 6 is obtained by $$V_0=IxZ_0/[1+(Z_0/AZ_{2\ 4\ 5})] \quad (5)$$

In the equation (5), assuming that A is very large, the second term $(Z_0/AZ_{2\ 4\ 5})$ of the denominator can be almost negligible. Thus, $$V_0=IxZ_0$$

Hence, the influence of the ambient temperature and humidity upon the external cylinder 67 and the shielding tube 1, which compose the powder passage is almost negligible. Further, a change in the electrostatic capacity can be measured accurately. Consequently, the variation in the powder flow rate can be measured precisely.

Figure 8:
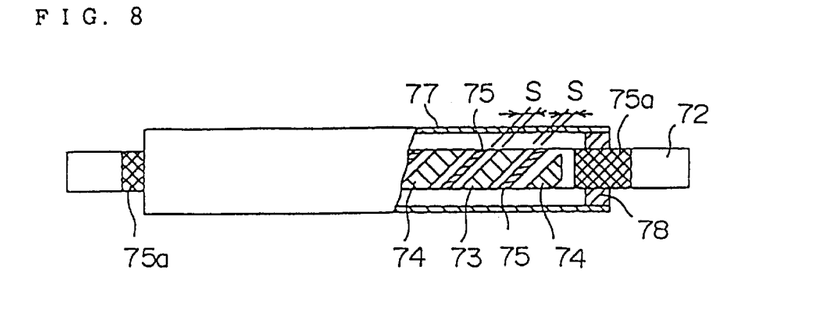
FIG. 8 is a partial cutaway sectional diagram for illustrating another powder flow rate measuring device.
Figure 9:
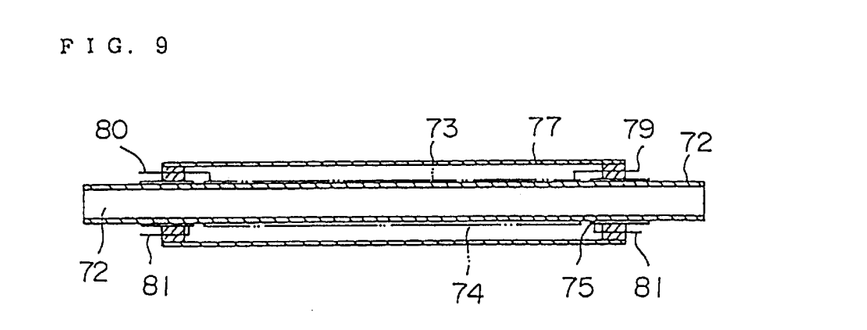
FIG. 9 is a sectional diagram showing the flow rate measuring device of FIG.8.

Flow rate measuring devices of the configurations of FIGS. 8 and 9 may be used as the powder flow rate measuring device 6. A source electrode 73, a sense electrode 74 and a guard electrode 75 are spirally formed on the circumferential portion of a measuring tube 72. Namely, the band-like guard electrode 75, which is narrower than the electrodes 7 and 74, is spirally formed between the source electrode 73 and the sense electrode 74 on the circumferential surface of the measuring tube 72 in such a manner that a narrow gap intervenes between the guard electrode 75 and each of the electrodes 73 and 74. The measuring tube 72 is made of, for example, quartz glass. Further, the outer diameter, the inner diameter and the length of the measuring tube 72 are 7 mm, 5 mm and 110 mm, respectively. Moreover, the measuring tube 72 is enclosed in the external cylinder serving as a shield. A sealant 78 intervenes between an end portion 75a of the guard electrode 75 of the measuring tube 72 and an end portion of the external cylinder 77 and seals the space between the external cylinder 77 and the measuring tube 72. Thereby, moisture is prevented from getting into this space. Incidentally, reference numeral 79 designates a terminal for the source electrode; 80 a terminal for the sense electrode; and 81 a terminal for the guard electrode.

The winding width and the contact angle of each of the source electrode 73 and the sense electrode 74 are 4.9 mm and 45°, respectively. Each of the width of the space between the source electrode 73 and the guard electrode 75 and that of the space between the guard electrode 75 and the sense electrode 74 is 1.5 mm. Incidentally, the winding width of the guard electrode 75 is 0.9 mm.

Figure 10:
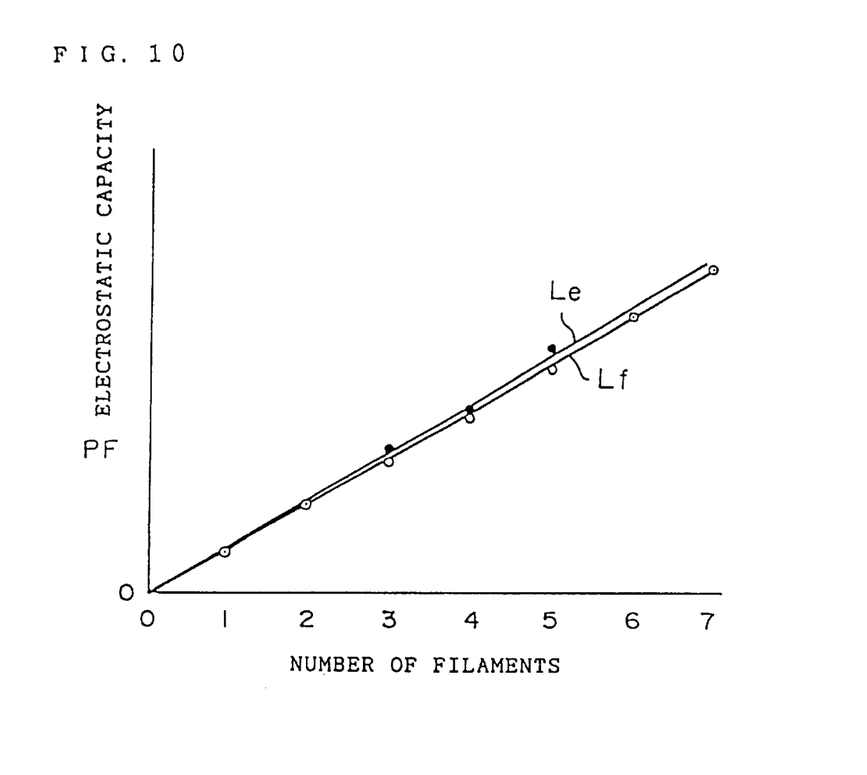
FIG. 10 is a graph illustrating the relation between the number of nylon filaments and the measured value of electrostatic capacity in the case when the filaments are inserted into the flow rate measuring device of FIG. 8.

FIG. 10 illustrates a straight line Le representing the value measured by inserting a nylon filament into the measuring tube 72 of the powder flow rate device of FIGS. 8 and 9 in such a manner as to extend from the bottom point C of the inlet thereof toward the top point C' of the outlet thereof and a straight line Lf representing the value measured by inserting a nylon filament into the measuring tube 72 in such a manner as to extend from the bottom point D of the inlet thereof toward the top point D' of the outlet thereof (substantially similar to the illustration of FIG. 4). The variation in the measured value of the electrostatic capacity depending on the place, through which the powder passes, in the measuring tube 72 is extremely small. Thus, even in the case when the actual powder passage changes, an error of the measured value, which is caused by the change of the passage, hardly occurs.

Embodiment 2

Figure 11:
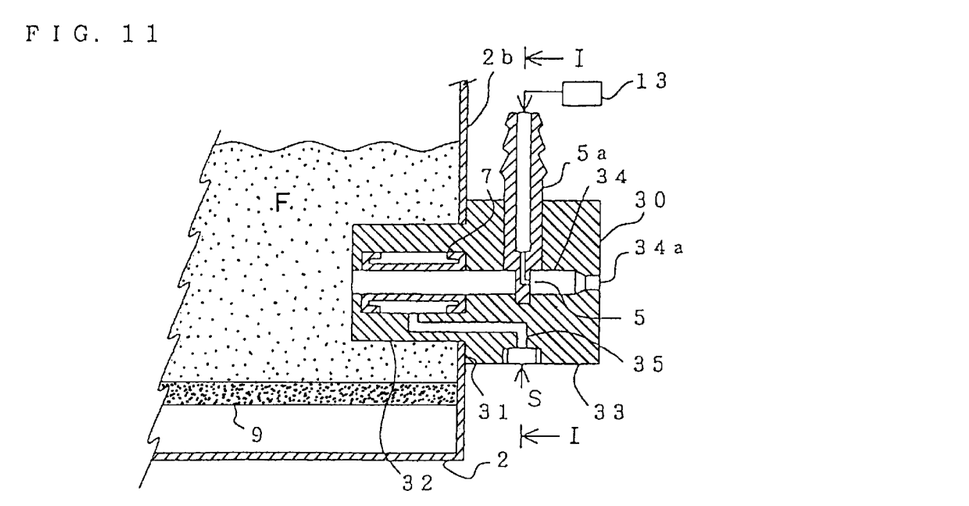
FIG. 11 is a sectional diagram showing a primary part of a powder supplying apparatus according to Embodiment 2 of the present invention.
Figure 12:
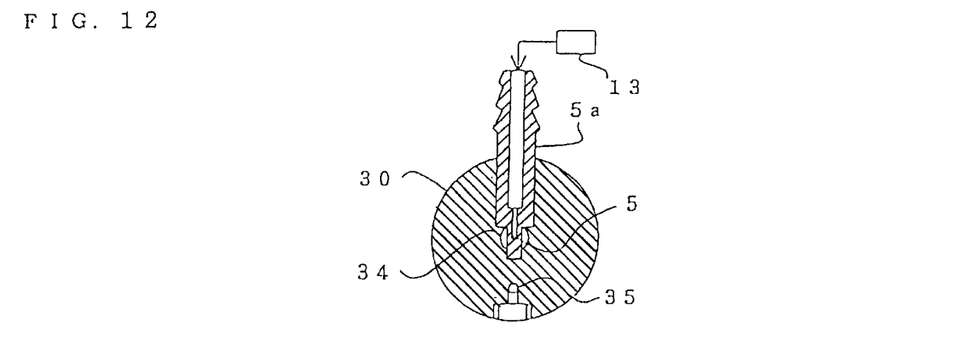
FIG. 12 is a sectional diagram taken on line I—I of FIG. 11.

FIGS. 11 and 12 illustrate a primary part of another powder supplying apparatus according to Embodiment 2 of the present invention. In the case of this powder supplying apparatus, the air blowing nozzle 5 and the pinch valve 7 are incorporated into a single holder 30. The holder 30 is nearly cylindrical and has a small-diameter portion 32 to be inserted into the tank 2 and a large-diameter portion 33 to be projected therefrom, the border between which is a step portion 31. A powder passage 34 is formed in the holder 30. Further, the pinch valve 7, which is placed at the upstream side of the powder passage 34, and the blowing nozzle 5, which is placed at the downstream side thereof, are incorporated into the holder 30 in such a manner as to be integral therewith. Another valve means may be used instead of the pinch valve 7. Operations of opening and closing the powder passage 4 are performed by introducing compressed air S from the unillustrated air supply into a flow passage 35 formed in the holder 30. Moreover, the fluid to be used for detecting powder is introduced thereinto by blowing a predetermined amount of air into the blowing nozzle through the flow rate setting means 13. Incidentally, the conveying tube 4 and the capacity measuring device 6 and so forth are connected to a rear end portion 34*a* of the powder passage 34.

The holder 30 can be fixed to a side wall 2*b* of the tank 2 by using an adhesive agent or welding. Alternatively, the blowing nozzle 5 may be detachably mounted on the holder 30 by forming a male screw on the circumferential surface of a tube 5*a* constituting the blowing nozzle 5 and further forming a female screw on the inner surface of the tube 5*a* in such a way as to mesh with the male screw. Thus, the blowing nozzle 5, which is very liable to be worn particularly owing to contact made with the powder flow, can be easily exchanged by incorporating the nozzle 5 and the pinch valve 7 into the single holder 30.

Embodiment 3

Figure 13:
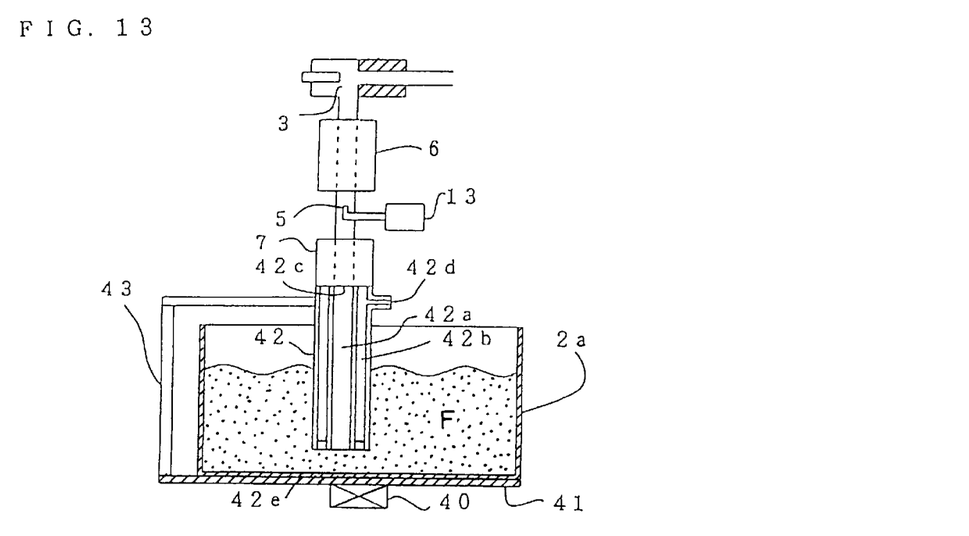
FIG. 13 is a sectional diagram showing a primary part of a powder supplying apparatus according to Embodiment 3 of the present invention.

FIG. 13 illustrates a primary part of another powder supplying apparatus according to Embodiment 3 of the present invention. In the case of this powder supplying apparatus, a powder container, for example, a paint case supplied by a paint maker can be applied as the tank, just the way it is. As shown in FIG. 13, a paint case 2*a* serving as the tank is placed on a load-carrying platform 41 to which a vibrator 40 is attached. A powder extracting tube 42 having inner and outer conduits, namely, having a double pipe, which has a central portion, in which a powder passage 42*a* is formed, and further has a peripheral portion in which a fluid passage 42*b* formed therein, is supported on the load-carrying platform 41 through a support 43 and is provided in such a way as to extend in the paint case 2*a* nearly vertically. The pinch valve 7 is connected to the rear end portion 42*c* of the powder extracting tube 42. Additionally, the blowing nozzle 5, the capacity measuring device 6 and the injector 3 and so on are further connected thereto. Incidentally, even when the quantity of powder F becomes small in the paint case, the powder F can be efficiently extracted by placing the paint case 2*a* on the load-carrying platform 41 at a tilt.

In the case of the powder supplying apparatus of FIG. 13, the paint case 2*a* is vibrated by the vibrator 40. Moreover, a small quantity of air is blown into the vicinity of the powder suction opening 42*e* from the fluid supplying port 42*d* through the fluid passage 42*b*. Thus, the powder contained in the paint case 2*a* is fluidized locally. Subsequently, when the driving air is blown into the injector 3 while the pinch valve 7 is opened, the powder F is sucked from the paint case 2*a* to the powder passage 42*a*. This powder supplying apparatus has advantages in that the paint case supplied from the paint maker and so forth can be used as the tank, just the way it is, because the powder does not flow at all times, the quality of the powder is hardly altered and the quantity of fluid air can be small.

Embodiment 4

Figure 14:
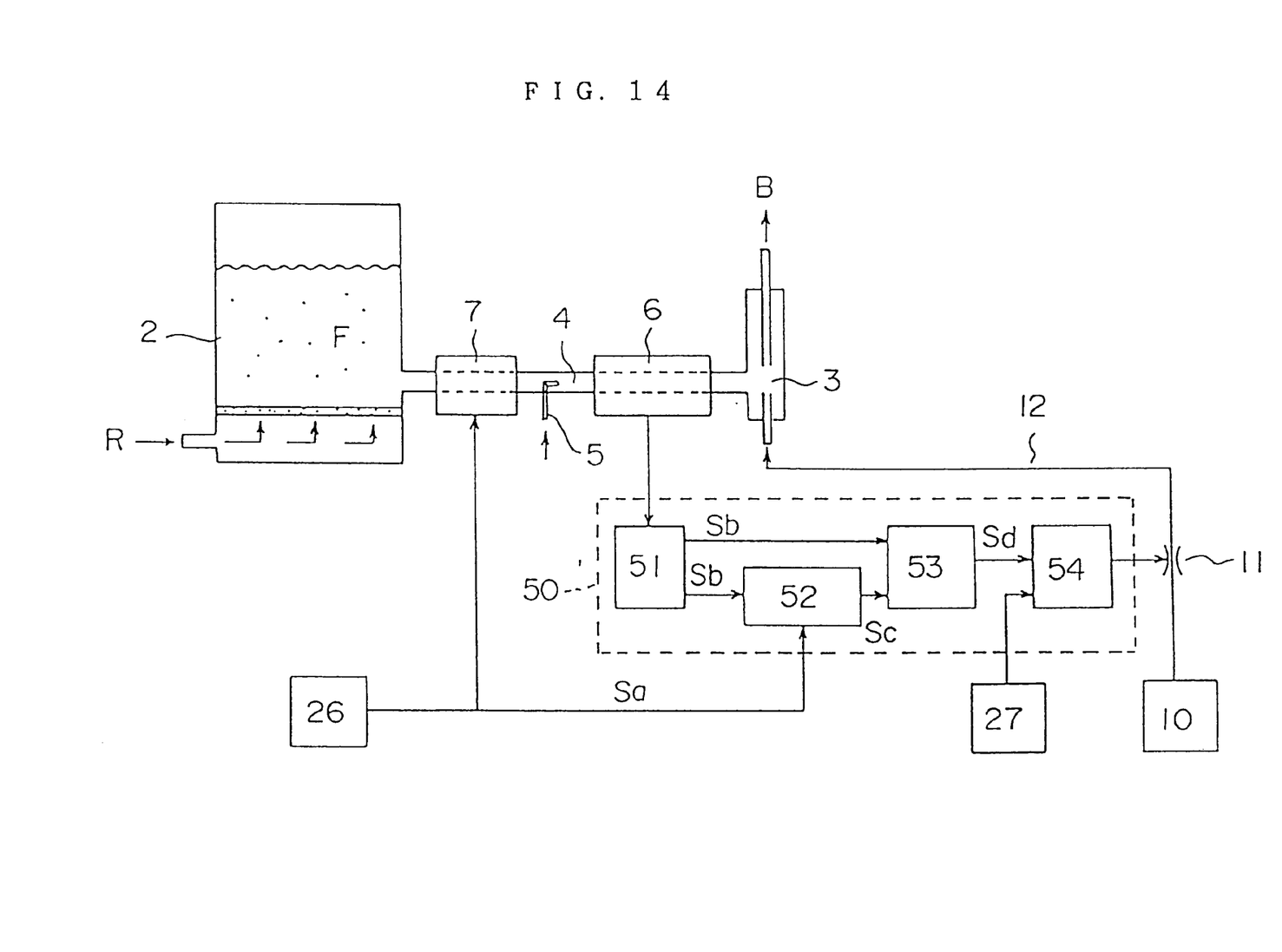
FIG. 14 is a block diagram illustrating the configuration of a powder supplying apparatus according to Embodiment 4 of the present invention.

FIG. 14 illustrates the configuration of another powder supplying apparatus according to Embodiment 4 of the present invention. This powder supplying apparatus is obtained by providing a control means 50 in the powder supplying apparatus according to Embodiment 1 of FIG. 1 in place of the control means 20. The control means 50 has a first amplifier 51 for amplifying a signal sent from the powder flow rate measuring device 6. A holding circuit 52 and a second amplifier 53 are connected to this first amplifier 51. A control circuit 54 is connected to the second amplifier 53.

After a signal Sb is obtained by amplifying the signal, which is sent from the powder flow rate measuring device 6, in the first amplifier 51, the amplified signal is branched into two signals, one of which is inputted to the second amplifier 53. The other of the two signals is inputted to the holding circuit 52. This holding circuit 52 latches the signal Sb coming from the first amplifier 51 at a moment t2 until which about one second has passed since a designated moment, for example, a moment t1 at which an off-signal Sa for turning off, for example, the spray gun or the like is received (See FIG. 15) Then, the holding circuit 52 keeps outputting the latched signals Sb as output signals Sc until a moment t3 at which one second has passed since the next new off-signal Sa is received. At the moment t3, the holding circuit 52 latches the signal Sb currently coming from the first amplifier 51 and outputs the signal Sb as a new output signal Sc.

Figure 15:
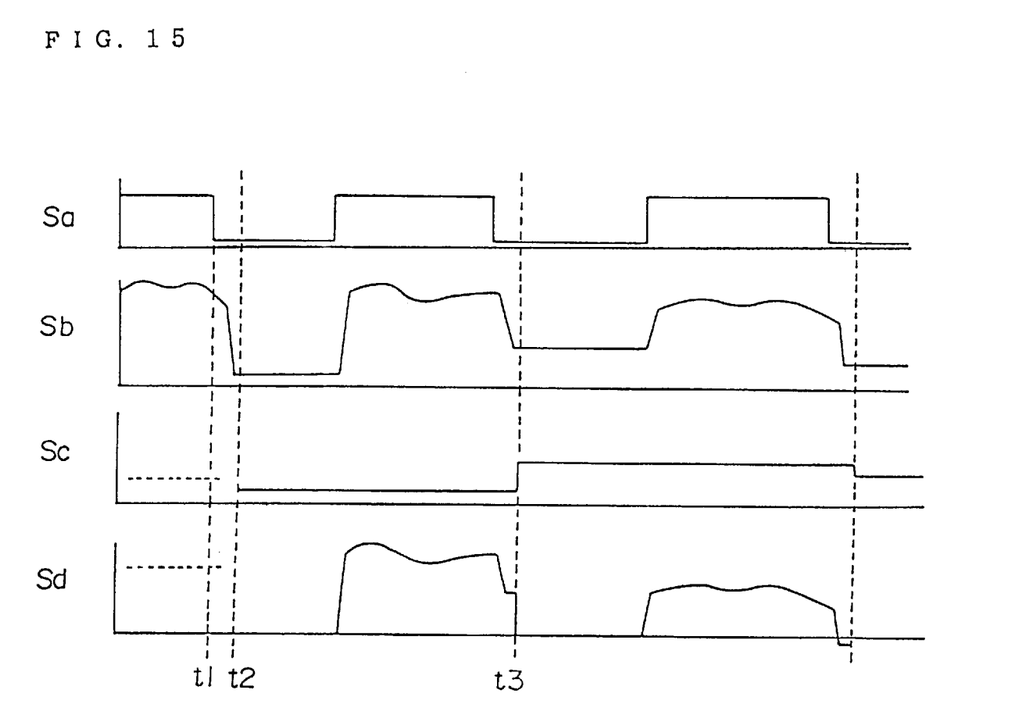
FIG. 15 is a timing chart according to Embodiment 4 of the present invention.

Incidentally, the time, at which the holding circuit 52 received in a signal, is not limited to the moment, until which about one second has passed since the off-signal Sa is inputted thereto, and is managed by using a microcomputer together with a monitor for a signal corresponding to each channel. Further, the time period is selected from values between 0.5 and 5 seconds according to the weight of powder. In the case when 5 seconds or more has passed after the off-signal Sa is inputted, the signal becomes stable and does not further change. If measured in such a case, it would be a waste of time. Usually, an input signal is received in by an A/D converter whereupon the input signal is converted into a digital signal. Then, the digital signal is outputted to a D/A converter. Incidentally, an output value is latched.

The second amplifier 53 performs an operation of obtaining the difference between the signal Sb sent from the first amplifier 51 and the signal Sc sent from the holding circuit 52 and outputs a difference signal Sd. This output signal is inputted to the control circuit 54 whereupon the value represented by this signal is compared with the preset target value 27. A signal representing the difference between these values is extracted as a controlling output signal and is used for controlling the motor valve 11 and so forth. Incidentally, the preset target value can be changed by an external input means if necessary, for example, when changing the applied coating.

Thus, at each operation of inputting of the off-signal Sa for turning off the spray gun or the like, by using a measured value, which is inputted from the powder flow rate measuring device 6 when a predetermined time passes as a reference value and by further correcting measured values which will be obtained thereafter, the influence of powder adhered to the power passage can be reduced to a degree that such powder has practically no bad effects.

Incidentally, in the case when the variation in the quantity of the powder adhered to the members composing the powder passage is large, it is preferable that several correction reference values are stored in the apparatus and that the mean value of these correction reference values is employed as the reference value for correcting measured values.

What is claimed is:

1. A powder flow rate measuring device comprising:
   a cylindrical measuring tube made of an insulating material;
   a pair of measuring electrodes provided along a circumferential portion of the measuring tube, the pair of measuring electrodes being band-like members provided on the circumferential portion of the measuring tube spirally in parallel with each other, and a band-like guard electrode provided on the circumferential portion of the measuring tube spirally between the pair of measuring electrodes, the guard electrode being narrower than the measuring electrodes, wherein a flow rate of powder passing through the measuring tube is measured as a change in electrostatic capacity between the pair of measuring electrodes.

2. The device according to claim 1 wherein the pair of measuring electrodes are formed on the circumferential portion of the measuring tube by being printed thereon.

3. The device according to claim 1 further comprising:

an external cylinder for electrically shielding the measuring tube;

a power source for applying a voltage across the pair of measuring electrodes;

a cable, connected to one of the pair of measuring electrodes, for picking up an electric current flowing through the pair of measuring electrodes;

a shielding tube for electrically shielding the cable; and an amplifier connected to the cable, wherein an output from the amplifier is connected to the external cylinder and the shielding tube.

4. The device according to claim 3 wherein the external cylinder is provided on the circumferential portion of the measuring tube through a sealant.

* * * * *